US009575285B2

(12) United States Patent
Dong et al.

(10) Patent No.: US 9,575,285 B2
(45) Date of Patent: Feb. 21, 2017

(54) LENS HOLDER DRIVING APPARATUS

(71) Applicants: Leping Dong, Shenzhen (CN); Shi Zhou, Shenzhen (CN)

(72) Inventors: Leping Dong, Shenzhen (CN); Shi Zhou, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 19 days.

(21) Appl. No.: 14/250,508

(22) Filed: Apr. 11, 2014

(65) Prior Publication Data

US 2015/0160471 A1 Jun. 11, 2015

(30) Foreign Application Priority Data

Dec. 6, 2013 (CN) .................. 2013 2 0797400 U
Dec. 6, 2013 (CN) .................. 2013 2 0798681 U

(51) Int. Cl.
*G02B 7/08* (2006.01)
*G02B 13/00* (2006.01)
*G02B 27/64* (2006.01)

(52) U.S. Cl.
CPC ............ *G02B 7/08* (2013.01); *G02B 13/001* (2013.01); *G02B 27/646* (2013.01)

(58) Field of Classification Search
CPC .... G02B 7/02; G02B 7/04; G02B 7/08–7/105; G02B 13/001; G02B 7/28–7/40; G02B 27/64; G02B 27/646; G03B 3/00; G03B 3/10–3/12; G03B 13/32–13/36
USPC .. 359/557, 819, 822–824, 554; 396/133–134
See application file for complete search history.

(56) References Cited

U.S. PATENT DOCUMENTS

| 2006/0164538 A1* | 7/2006 | Kawasaki et al. ............ 348/335 |
| 2012/0314308 A1* | 12/2012 | Ikushima ................. G02B 7/08 359/814 |
| 2013/0016427 A1* | 1/2013 | Sugawara ..................... 359/557 |

\* cited by examiner

*Primary Examiner* — Stephone B Allen
*Assistant Examiner* — James McGee
(74) *Attorney, Agent, or Firm* — Na Xu; IPro, PLLC

(57) ABSTRACT

A lens holder driving apparatus is disclosed. The lens holder driving apparatus includes a housing, an auto-focusing lens holder driving portion and a fixed portion. The auto-focusing lens holder driving portion includes an octagonal lens holder with a focusing coil, a positioning magnet mounted on the lens holder, a magnet holder with a magnet group including a bracket having a sidewall, a pillar projecting at the four corners of the sidewall of the bracket, and a first notch disposed at the pillar face to the focusing coil. The fixed portion includes a base having a sidewall, a FPC mounted on the sidewall of the base and a Hall element electrically connecting with the FPC inserted into the first notch for detecting the position of the positioning magnet so as to adjust the position of the lens holder.

7 Claims, 6 Drawing Sheets

LENS HOLDER DRIVING APPARATUS

RELATED PATENT APPLICATIONS

This application claims the priority benefit of Chinese Patent applications Filing Serial Numbers CN 201320797400.0 and CN 201320798681.1, both filed on Dec. 6, 2013, the disclosures of which are herein incorporated by reference in its entirety.

FIELD OF THE INVENTION

The present disclosure generally relates to the art of lens holder driving device, and more particularly to a lens holder driving apparatus being capable of picking up a static image without blurry images by stabilizing the blurry images occurring upon shooting the static image using a miniature camera for a mobile terminal.

DESCRIPTION OF RELATED ARTS

This invention relates to a lens holder driving device and, in particular, to a lens holder driving device being capable of picking up a static image without blurry images by stabilizing the blurry images (movement) occurring upon shooting the static image using a miniature camera for a mobile terminal.

Generally, a typical lens driving device includes a lens barrel, a coil directly wound around an outer circumferential surface of the lens module, a stationary magnetic field generator separated from the coil and interacted with the coil for generating an electromagnetic force for driving the coil together with the lens module to move approaching or away along the optical axis, and at least one elastic member attached to the stationary magnetic field generator and the lens module, respectively. The lens module defines a lens group and a lens barrel accommodating the lens group therein.

Hitherto, various lens holder driving devices have been proposed which are capable of taking photographs with a high degree by stabilizing blurry images on an image-forming surface although there are blurry images upon shooting the static image. Image stabilizing methods, like "optical methods" such as a sensor shift method or a lens shift method and "a software stabilizing method" for stabilizing the blurry images using image processing by software are known.

for example, a sensor shifting method is disclosed in Patent JP2004274242 (hereinafter, "Patent Literature"). A digital camera disclosed in the Patent Literature has a configuration in which an imaging device (CCD) is movable centered on a reference position by means of an actuator. The actuator performs camera-shake correction by moving a CCD according to camera shake detected by a vibration sensor. The CCD is located in a CCD moving section. The CCD can be moved by means of the CCD moving section within an XY plane perpendicular to a Z axis. The CCD moving section comprises three main members: a base plate fixed to a housing, a first slider that moves in the X-axis direction with respect to the base plate, and a second slider that moves in the Y-axis direction with respect to the base plate.

In a sensor shifting method such as disclosed in the Patent Literature, the CCD moving section is large. Consequently, it is difficult to apply a sensor-shifting type of camera-shake correction apparatus to a small camera for a mobile phone, from the standpoint of the trend of low-profile (external shape and dimension).

Therefore, a problem with an image blurring correction apparatus having such a structure is that its structure is complex and it is not suitable for miniaturization.

So, it is necessary to provide a new, low-profile lens holder driving apparatus for solving the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Figure 1:
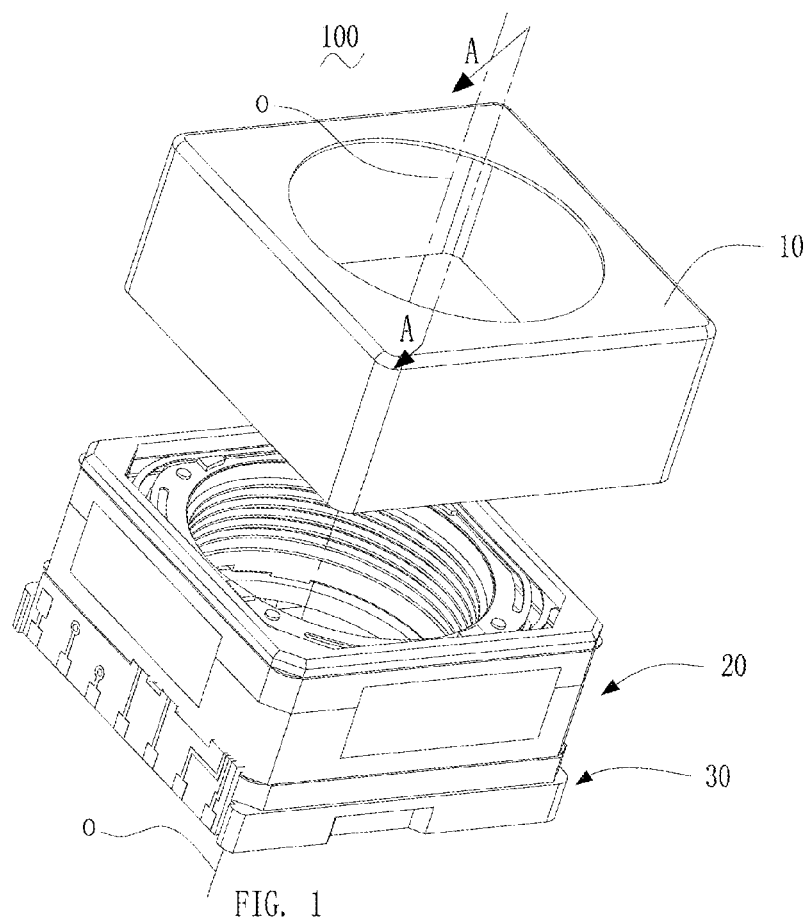
FIG. 1 is an isometric view of a lens holder driving apparatus in accordance with an exemplary embodiment of the present disclosure.
Figure 2:
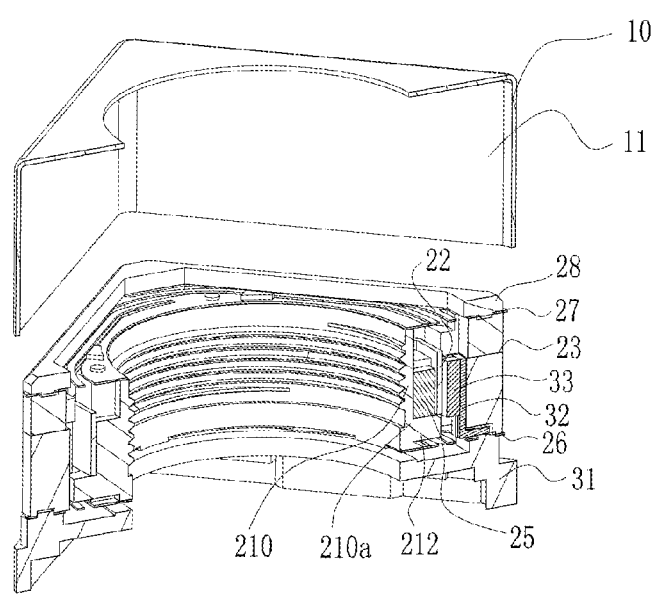
FIG. 2 is a cross-sectional view of the lens holder driving apparatus taken along line A-A in FIG. 1.

While the invention is susceptible of embodiments in many different forms, there is shown in the drawings and will herein be described in detail embodiment of the invention with the understanding that the present disclosure is to be considered as an exemplification of the principles of the invention and is not intended to limit the broad aspect of the invention to the embodiment illustrated.

Referring to FIGS. 1 through 4, a coordinate system (X, Y, O) is used. In a state illustrated in FIGS. 3 through 4 in the coordinate system (X, Y, O), an X-axis direction is a left-and-right direction, a Y-axis direction is a fore-and-aft direction, and an O-axis direction is an up-and-down direction. In addition, the direction O is a direction of an optical axis O of a lens. In the exemplary embodiment, the X-axis direction is called a first direction (the left-and-right direction) while the Y-axis direction is called in a second direction (the fore-and-aft direction). However, in an actual use situation, an upper direction of the O-axis becomes a front direction while a lower direction of the O-axis becomes a rear direction. The first direction X and the second direction Y which are orthogonal to the optical axis O and which are perpendicular to each other.

The illustrated lens holder driving apparatus 100 is mounted to a mobile terminal such as a camera-equipped cellular mobile phone which is enable automatic focusing (AF), a smart phone, a notebook personal computer, a tablet-type personal computer, a mobile-type game machine, a Web camera, a vehicle-mounted camera, or the like. The lens holder driving apparatus 100 includes a housing 10, an auto-focusing lens holder driving portion 20 and a fixed portion 30.

The housing 10 includes a rectangular tubular portion 11 for covering an outer periphery of the auto-focusing lens holder driving portion 20 and a ring-shaped upper end portion for covering an upper surface of the auto-focusing lens holder driving portion 20. The upper end portion has a circular opening 12 concentric with the optical axis O.

The auto-focusing lens holder driving portion 20 has a lens holder 21 including a tubular portion for holding one lens barrel along the optical axis O, a ring-shaped focusing coil 22 entwined the lens holder 21 so as to position around the tubular portion thereof, a positioning magnet 25, a magnet holder 23 for holding a magnet group 24 disposed opposite to the focusing coil 22 at the outside of the focusing coil 22, a first and second spring 26 and 27 mounted on the lower and upper ends 23a1 and 23b1 of the magnet holder 23 in the direction of the optical axis O, and a lid 28 mounted on the magnet holder 23 for holding the second spring 27 between the lid 28 and the magnet holder 23.

For apart from a bottom portion of the auto-focusing lens holder driving portion 20, the fixed portion 30 is disposed. Although illustration is not made, the fixed portion 30 has a lower portion on which an image pickup device disposed on an image pickup board is mounted. The image pickup device picks up a subject image formed by the lens holder to convert it into an electric signal. The image pickup device may, for example, has a charge coupled device type image sensor, a CMOS (complementary metal oxide semiconductor) type image sensor, or the like.

The fixed portion 30 has a base 31, a flexible printed circuit (FPC) 32 and a Hall element 33. The base 31 is ring-shaped which has a rectangular outside shape and which has a circular opening 3113 in the interior thereof. Specifically, the base 31 includes four sidewalls 311 and the circular opening 3113 is formed by the four sidewalls 311. One of the four sidewalls has two positioning protrusions 3111 which project outwards on the surface of the sidewall and a nick 3112 formed between the two positioning protrusions 3111 for fixing the FPC 32.

The first spring 26 and the second spring 27 serve as guiding arrangements for guiding the lens holder 21 to move along the optical axis O. That is to say, the second spring 27 has an outer circuit portion mounted on the magnet holder 23, an inner circuit portion mounted on a lower end portion of the lens holder 21, and a plurality of first arms provided between the outer circuit portion and the inner circuit portion of the second spring 27. That is, the plurality of first arms connects inner circuit portion to the outer circuit portion for providing enough elastic force to the lens holder 21. The structure of the first spring 26 is substantially identical to the second spring 27 in the present embodiment. In addition, the second spring 26 further includes a pair of electrodes for electrically connecting the FPC 32. Consequently, the first spring 26 is disposed at a lower side of the lens holder 21 along the optical axis O while the second spring 27 is disposed at an upper side of the lens holder 21 along the optical axis O. Namely, the lens holder 21 supports the magnet holder 23 by the first and second springs 26 and 27. Each of the first spring 26 and the second spring 27 is made of beryllium copper, phosphor bronze, or the like.

In the present embodiment, the magnet group 24 has four permanent magnet pieces 24a, 24b, 24c and 24d, the permanent magnet pieces embedded in the magnet holder 23 respect to the optical axis O at a right side, a left side, a front side and a rear side, respectively. In a word, four permanent magnet pieces 24 are disposed so as to be opposed to each other in the first direction X and the second direction Y.

Figure 3:
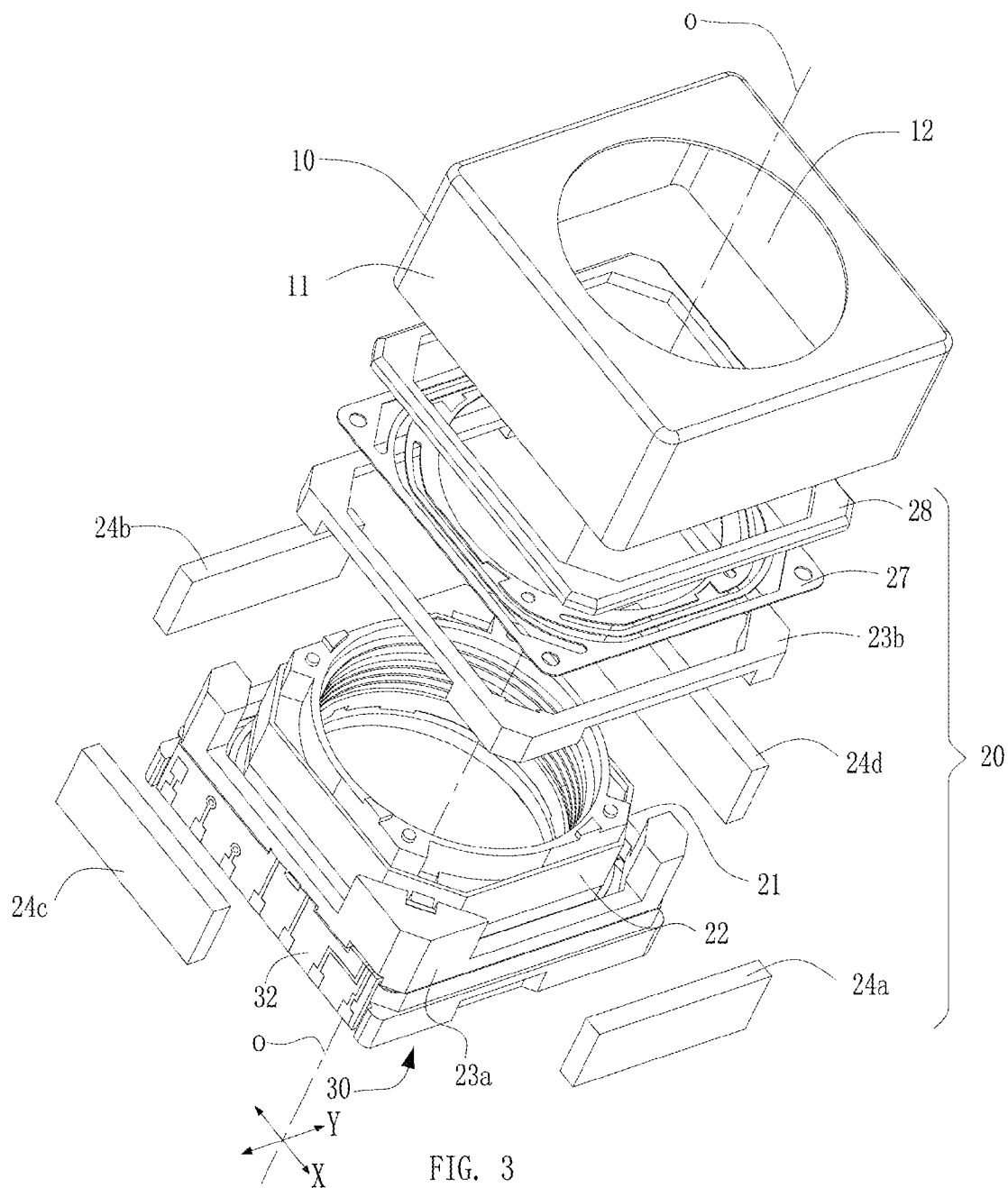
FIG. 3 is an isometric exploded view of the lens holder driving apparatus in FIG. 1.
Figure 4:
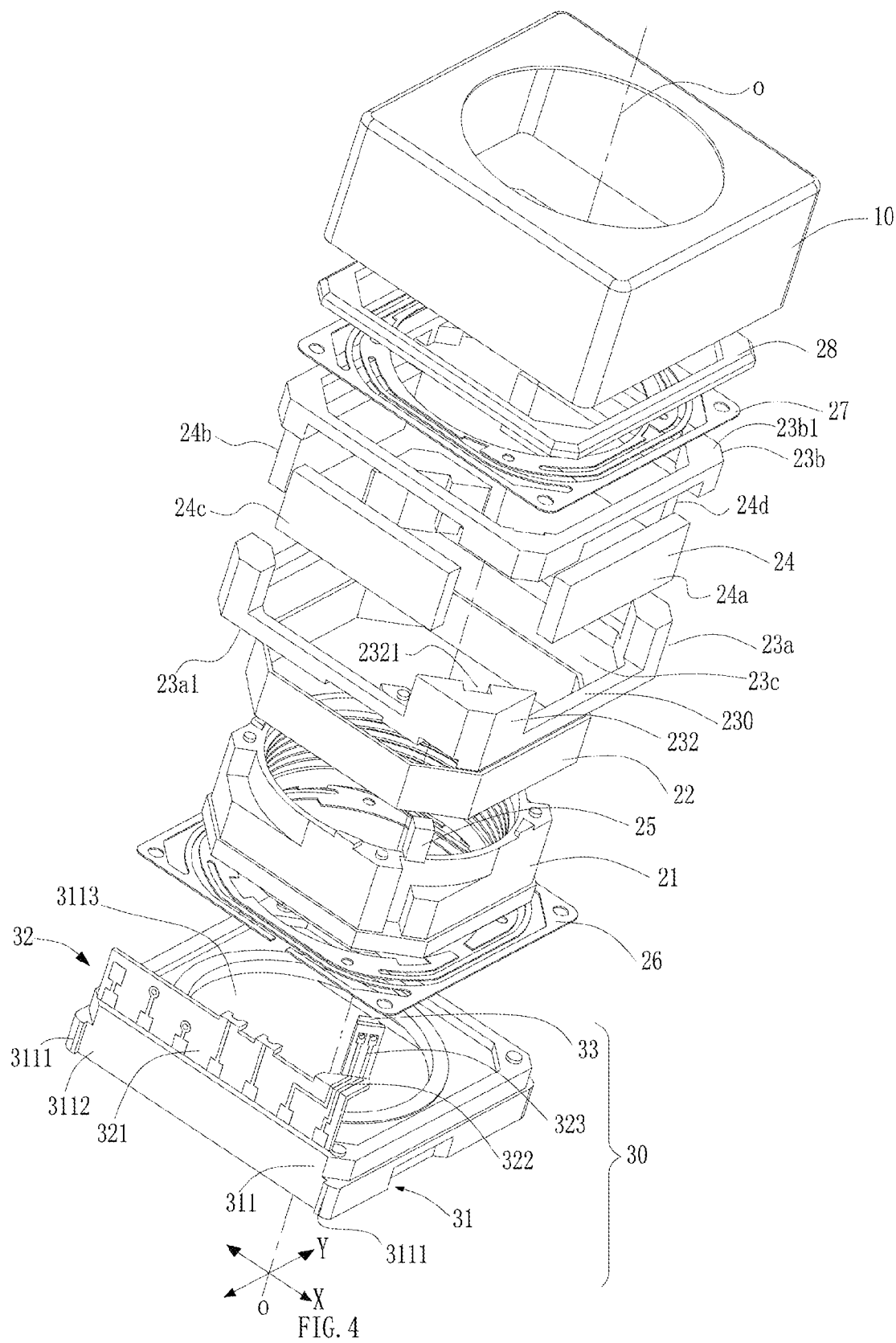
FIG. 4 is an isometric exploded view of the lens holder driving apparatus in FIG. 1, from another aspect.
Figure 5:
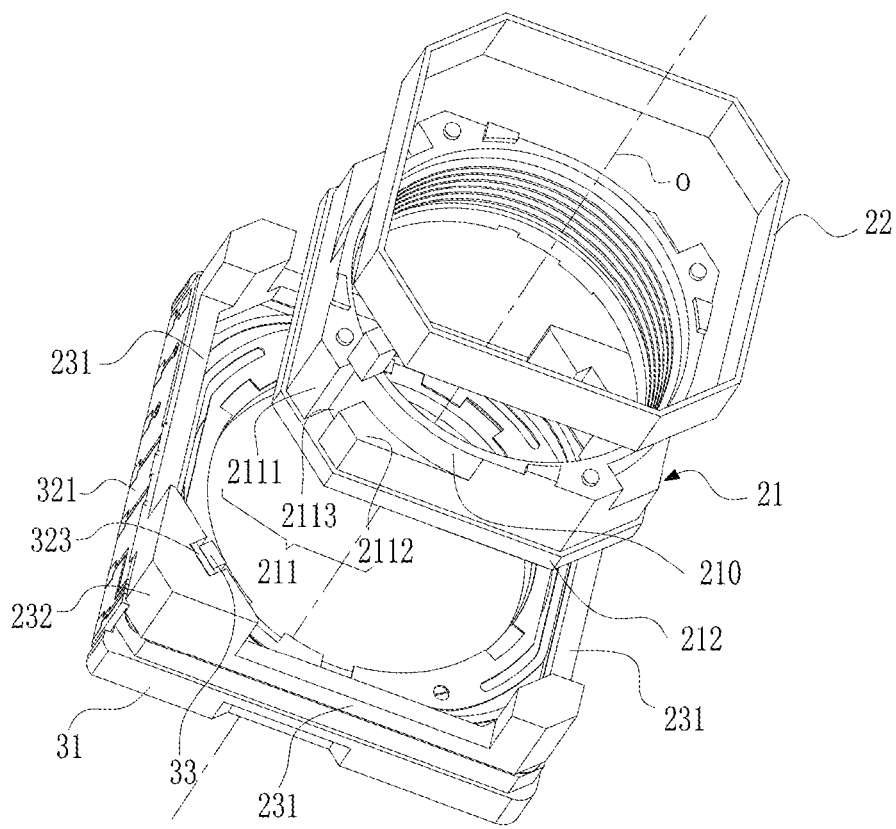
FIG. 5 is an isometric exploded view of the lens holder driving apparatus in FIG. 1, with a housing, a magnet and a upper spring thereof being removed away.
Figure 6:
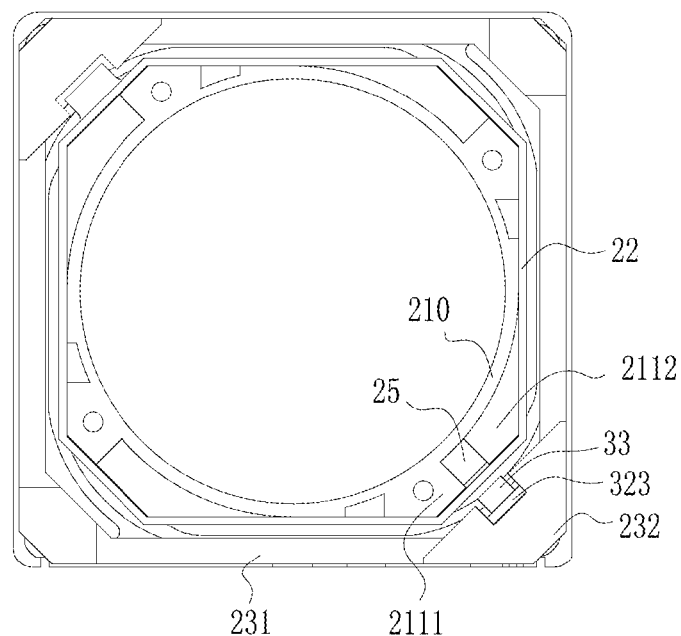
FIG. 6 is a top view of the lens holder driving apparatus in FIG. 5.
Figure 7:
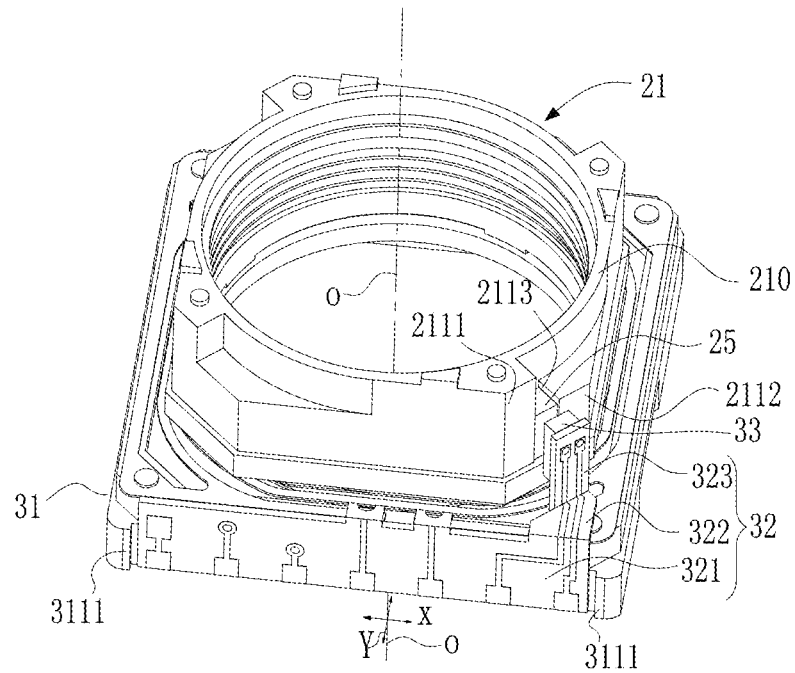
FIG. 7 is an isometric exploded view of the lens holder driving apparatus in FIG. 1 only showing a lens holder assembled with a fixed portion of the lens holder driving apparatus.
Figure 8:
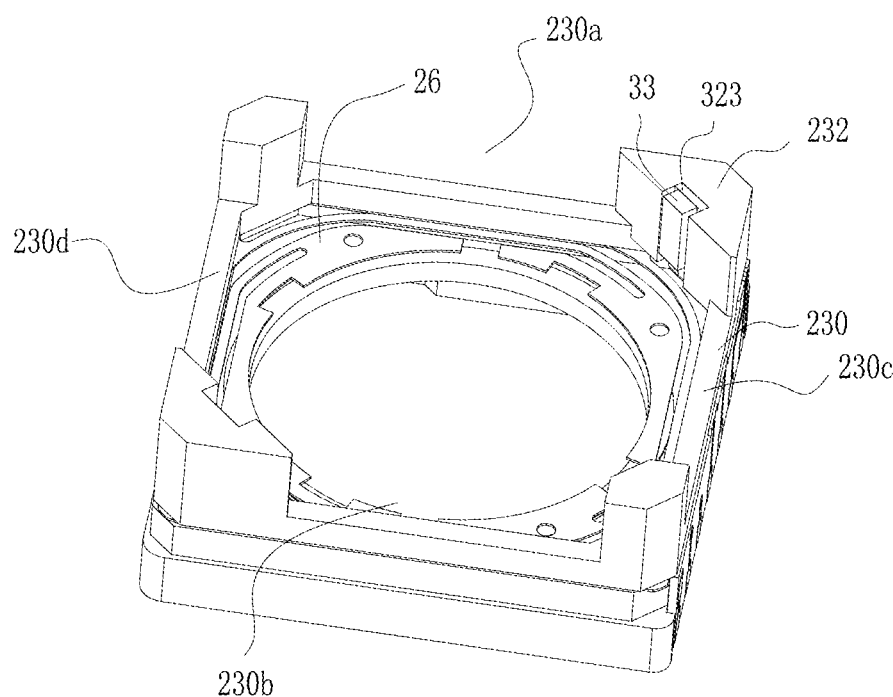
FIG. 8 depicts an assembled view of a base, a FPC and a Hall element.
Figure 9:
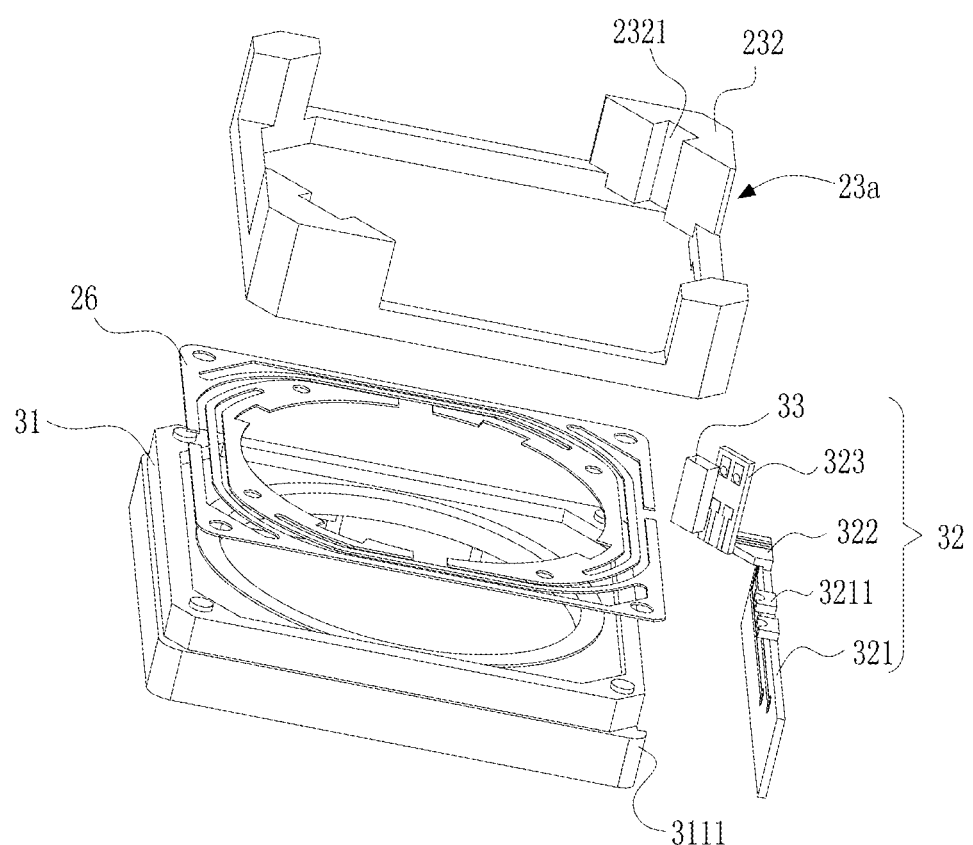
FIG. 9 is an isometric exploded view of the structure in FIG. 8.

The magnet holder 23 has an octagonal or a rectangular outside shape. Specifically, the magnet holder 23 has a lower bracket 23a disposed on the surface of the base 31 and an upper bracket 23b supported by the lower bracket 23a corporately forming the magnet holder 23 having four receiving spaces 231 for embedding the magnet group 24. In other embodiment, the magnet holder 23 may be an integrated configuration. The lower bracket 23a has a sidewall 230 and four pillars 232 which project at the four corners of the sidewall 230 upwards to supporting the upper bracket 23b along the optical axis O. The receiving space 231 is formed between adjacent two pillars 232. The pillar 232 further includes a first notch 2321 face to the lens holder 21 for receiving the Hall element 33 for detecting the position of the positioning magnet 25 so as to adjust the position of the lens holder 21. In the present embodiment, FIG. 3 illustrates only one first notch 2321 disposed on one pillar, but, the amount of the first notch is not limited to one, and may be adjusted according to actual requirement. Namely, every pillar may include one first notch, and the amount of the first notch is variable corresponding to actual requirements. A chamber 23c of the magnet holder 23 accommodates the lens holder 21 and the focusing coil 22 therein.

Referring to FIGS. 5 through 9, the lens holder 21 is substantially an octagonal tube. Specifically, the lens holder 21 comprises an outer tubular portion 210 having a circular tubular shape, an octagonal ring-shaped end portion 212 extending vertically from a lower end 210a of the outer tubular portion 210 in a radial direction of the optical axis O, and a positioning portion 211 provided at the four corners of the octagonal ring-shaped end portion 212 upwards to supporting the outer tubular portion 210 along the optical axis O. The positioning portion 211 is used for restricting the position of the positioning magnet 25 relative to the Hall element 33. In the embodiment, the positioning portion 211 includes a first positioning end 2111, and a second positioning end 2112 opposite to the first positioning end 2111. The first positioning end 2111 and the second positioning end 2112 corporately form a gap 2113 exactly located at the four corners of the octagonal ring-shaped end portion 212 for receiving the positioning magnet 25.

Turning back to FIG. 3, the focusing coil 22 is substantially an octagonal ring for accommodating the lens holder 21. For this reason, the focusing coil 22 has an octagonal cylindrical shape which coincides with an outer shape of the lens holder 21 having the octagonal tubular shape.

Furthermore, the FPC 32 has a first segment 321 inserted into the nick 3112, a second segment extending vertically from an end of the first segment along a direction perpendicularly to the optical axis O and a third segment 323 extending vertically from the second segment 322 along a direction parallel to the optical axis O. In addition, the FPC 32 further includes a pair of fourth segment 3211 extending from the first segment 321 serving as an electrode for electrically connecting to the first spring 26. A Hall element 33 is mounted on the third segment 323 for electrically connecting to the FPC 32 so as to transmit signal. In other embodiment, the shape of the FPC 32 is not restricted to the structure of four segments as described in this embodiment. Alternatively, the FPC 32 includes at least one segment mounted the sidewalls 311 of the base 31 and another segment may be inserted into the first notch 2321.

While assembled, the Hall element 33 and the third segment 323 as a whole is inserted into the first notch 2321 of the pillar 232 of the lower bracket 23a. The second segment 322 is sandwiched between the lower bracket 23a and the base 21. The first segment 321 is substantially inserted into the nick 3112 of the base 31 for electrical connecting the Hall element 33 to external circuit. At this point, the Hall element 33 is fixed at one corner of the magnet holder 23 exactly face to the positioning magnet 25 over the focusing coil 22. In a word, the focusing coil 22 is arranged between the positioning magnet 25 and the Hall element 33. Accordingly, the lens holder 21 together with the focusing coil 22 and the positioning magnet 25 severs as a rotor supported by the first spring and second springs 26 and 27 for moving along the optical axis O. The term "stator" here means the magnet holder 23 together with the magnet group 24 and the base serving as a whole remained stationary relative to the rotor. The Hall element 33 is configured for detecting position information related to the optical axis direction O of the lens holder 21 by detecting a magnetic force of the positioning magnet 25. The lens holder driving device 100 has simple structure, reliable operation characters.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A lens holder driving apparatus, comprising:
   an auto-focusing lens holder driving portion defining a lens holder of a substantial octagonal tube shape along an optical axis, a ring-shaped focusing coil entwining the lens holder, a positioning magnet, a magnet holder for holding a magnet group having four permanent magnet pieces disposed opposite to the focusing coil at an outside of the focusing coil, a first and second springs respectively mounted on lower and upper ends of the magnet holder for supporting the lens holder;
   a fixed portion defining a ring-shaped base and having four sidewalls, a flexible printed circuit mounted with one of the sidewalls of the ring-shaped base for electrically connecting the first spring and a Hall element;
   the lens holder defining an outer tubular portion having a circular tubular shape, an octagonal ring-shaped end portion extending vertically from a lower end of the outer tubular portion, and a one positioning portion provided in one of eight sides of the octagonal ring-shaped end portion for restricting the positioning magnet in proper position;
   the positioning portion of the lens holder further having a first positioning end, a second positioning end opposite to the first positioning end, and a gap formed between the first positioning end and the second positioning end for receiving the positioning magnet;
   the magnet holder defining a lower bracket disposed on the fixed portion, an upper base supporting by the lower bracket cooperatively forming a chamber accommodating the lens holder, the focusing coil and the positioning magnet therein, the lower bracket defining four sidewalls one by one connected for forming four corners and four pillars extending from four corners of the sidewalls of the lower bracket upwards to support the upper bracket, and four receiving spaces formed by the four sidewalls cooperatively with the four pillars for receiving the magnet group, a first notch arranged on one of the pillars to face the gap of the positioning portion;
   the four permanent magnet pieces positioned in the four receiving spaces, respectively;
   the flexible printed circuit defining a first segment mounted on the sidewall of the ring-shaped base, a second segment extending from the first segment and a third segment extending vertically from the second segment along a direction parallel to the optical axis into the first notch of the lower bracket;
   the Hall element mounted on the third segment of the flexible printed circuit to face to the positioning magnet over the focusing coil for detecting a position of the positioning magnet so as to adjust the position of the lens holder.

2. The lens holder driving apparatus as described in claim 1, wherein the focusing coil of an octagonal cylindrical shape which coincides with an outer shape of the lens holder having the octagonal tubular shape.

3. The lens holder driving apparatus as described in claim 1, wherein the sidewall of the base further includes two positioning protrusions projecting outwards on a surface of the sidewall and a nick formed between the two positioning protrusions for fixing the first segment of the flexible printed circuit.

4. The lens holder driving apparatus as described in claim 3, wherein the second segment extends horizontally from an end of the first segment along a direction perpendicular to the optical axis.

5. The lens holder driving apparatus as described in claim 4, wherein the second segment of the flexible printed circuit is sandwiched between the lower bracket and the ring-shaped base of the fixed portion.

6. The lens holder driving apparatus as described in claim 5, wherein the flexible printed circuit further includes a fourth segment extending from the first segment of the flexible printed circuit serving as an electrode for electrically connecting the first spring.

7. The lens holder driving apparatus as described in claim 6, wherein each of the first and the second springs defines an outer circuit portion mounted on the magnet holder, an inner circuit portion mounted on the lens holder, and a plurality of arms disposed between the outer circuit portion and the inner circuit portion.

* * * * *